UNITED STATES PATENT OFFICE.

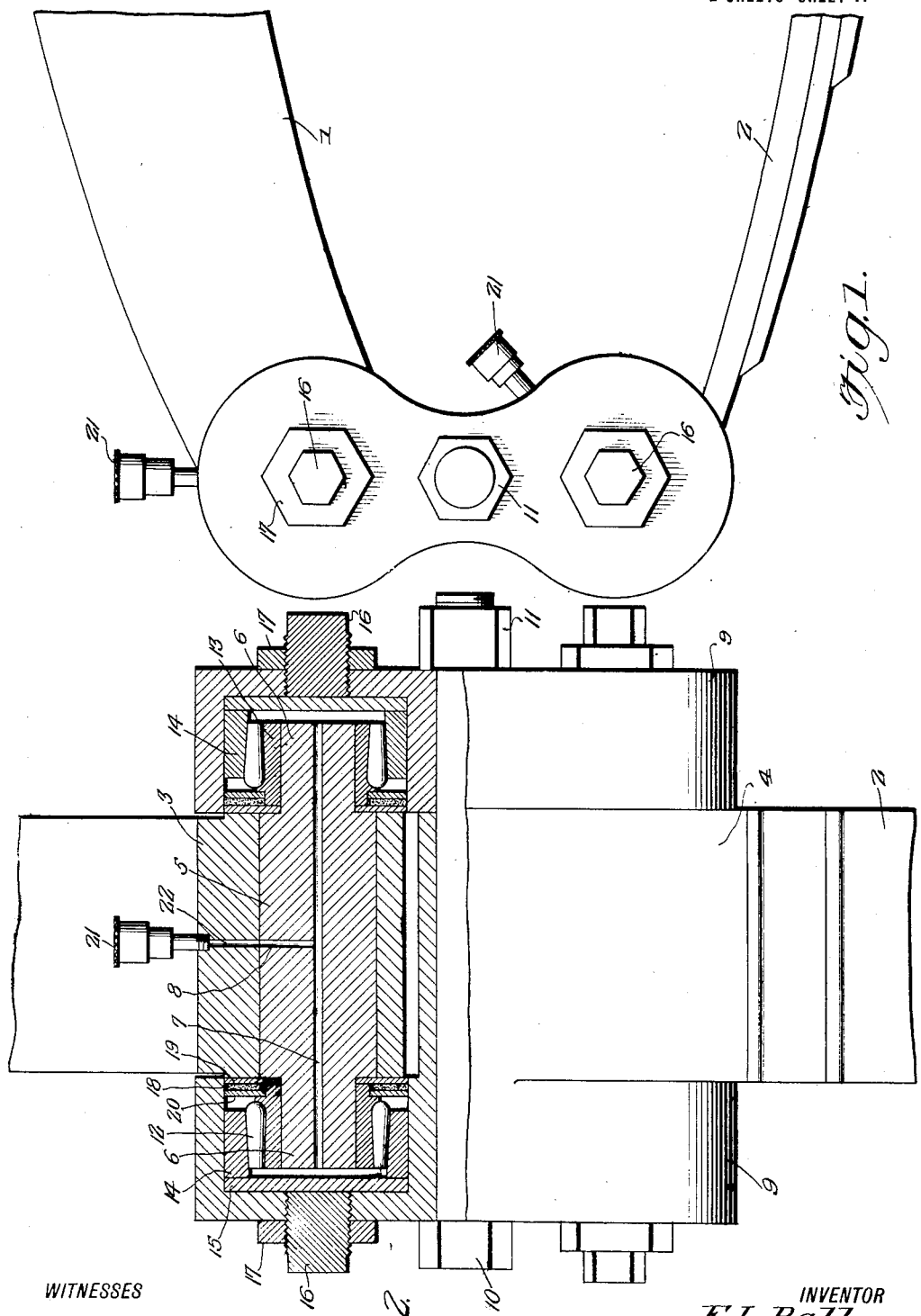

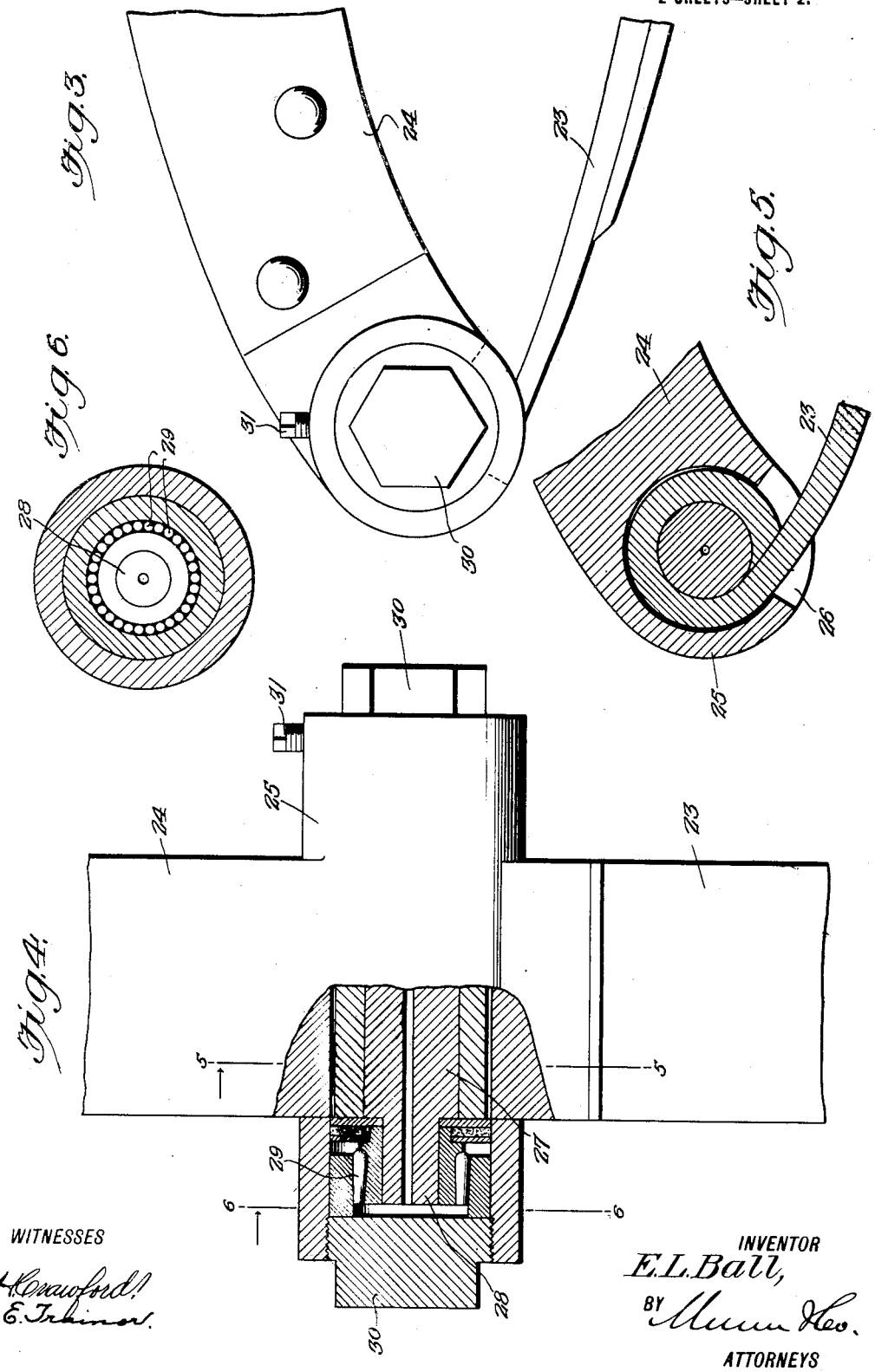

EDWIN LEO BALL, OF ALEXANDRIA, LOUISIANA.

SPRING-SHACKLE.

1,370,623.  Specification of Letters Patent.  Patented Mar. 8, 1921.

Application filed July 13, 1920. Serial No. 395,834.

*To all whom it may concern:*

Be it known that I, EDWIN LEO BALL, a citizen of the United States, and a resident of Alexandria, in the parish of Rapides and State of Louisiana, have invented certain new and useful Improvements in Spring-Shackles, of which the following is a specification.

My invention is an improvement in spring shackles, and has for its object to provide a shackle of the character specified, designed to prevent the usual noises attendant on the use of the usual type of shackle, wherein a specially designed roller bearing is substituted for the usual bolt and bushing.

In the drawings:

Figure 1 is a side view of the improved shackle,

Fig. 2 is a view at right angles to Fig. 1, with the upper bearing in section,

Fig. 3 is a view similar to Fig. 1, showing another embodiment of the invention, Fig. 4 is a view at right angles to Fig. 3, with a part in section, Figs. 5 and 6 are sections on the lines 5—5 and 6—6, respectively of Fig. 4.

In the embodiment of the invention shown in Figs. 1 and 2, the end of the frame 1, and the end of the spring 2 have bearings indicated at 3 and 4 in which are received shafts or spindles 5. Each of these shafts or spindles 5 has its ends reduced as shown at 6, and the said ends extend beyond the bearings 3 and 4 as shown.

Each shaft is axially bored as shown at 7, and each shaft has also a radial opening 8 leading to the axial bore for a purpose to be presently described. Shackles 9 are provided at the ends of the bearings, each shackle having at each end a cup-shaped portion which fits over the reduced end 6 of the adjacent shaft 3 or 4 as the case may be.

The shackles are held in place by means of a bolt 10 which passes through the two shackles at their centers, the bolt being between the bearings 3 and 4. A nut 11 engages the bolt at the opposite end from the head of the bolt, and clamps the shackles in place. A roller bearing is arranged between each reduced portion 6ª of each shaft 6, and the shackle, the rollers 12 of the said bearings being arranged within a race consisting of an inner section 13 and an outer section 14.

The inner section of the race fits over the reduced end 6ª of the shaft 6, and the outer section 14 of the race fits within the shackle. The rollers 12 are arranged between the sections of the race. Referring to Fig. 2, it will be seen that each of the rollers is tapering, gradually decreasing in diameter from near its inner end to near its outer end, and the adjacent faces of the race sections are shaped to fit the form of the rollers. The rollers are separated and held in position by cages, and the race 13 and rollers are assembled as one unit.

The inner end of each roller is rounded as shown, and the outer section of the race is arranged to be adjusted by means of a plate or disk 15 which fits within the shackle and bears against the outer end of the race section 14.

An adjusting screw 16 is threaded through each shackle axially with respect to the shaft 6, the inner end of the screw engaging the plate or disk 15, and a lock nut 17 is arranged on each screw to hold it in adjusted position. It will be óbvious that by turning the screw in the proper direction, the section 14 of the race may move inwardly, to compensate for wear on the rollers or the race sections, and to adjust the bearing to the proper tightness.

A washer 18 of felt or the like is arranged at the inner end of each race section 13, between washers 19 and 20, the washer 19 seating between the inner race section 13 and the annular shoulder formed by reducing the shaft 6, while the washer 20 is seated in a rabbet at the inner end of the section 13 of the race. Each bearing 3 and 4 has an oil cup 21 connected therewith, and each bearing has also a passage 22, that of the bearing 3 being shown, through which the oil cup communicates with the radial passage 8 before mentioned.

The lubricant passes by way of the passage 8 through the passage 7 to the bearings, thoroughly lubricating all of the parts and eliminating friction. It will be noted from a consideration of Fig. 2, that all of the rollers of the bearings are tapered, but the axes of the rollers are parallel to the axis of the shaft. All end thrust is taken up by the rollers. For instance, inward thrust on the outer race section bears against the tapered peripheral surface of the roller. Outward thrust on the inner race section is similarly received. When the shackle is once packed with lubricant no further attention is necessary.

The outer race is adjustable, without the necessity of dismantling the assembly. All that is necessary to adjust the bearing is to loosen the nut lock and turn the set screw slightly. In the embodiment of the invention shown in Figs. 3 to 6, the spring indicated at 23 is connected directly with the frame 24 without the intervention of the shackle. The frame has a bearing 25, which is slotted intermediate its ends, as shown at 26 to receive the bearing of the spring 23.

The shaft 27 which corresponds to the shaft 6 of Fig. 1, is passed through the bearing of the spring, the reduced ends 28 thereof extending within the ends of the bearing 25, which bearing is of greater length than the width of the spring 24 as clearly shown in Fig. 4.

The roller bearing at each end, indicated generally at 29, corresponds to that shown in Fig. 1, and the outer section of the bearing is adjusted by means of an adjusting nut 30 which is threaded into the end of the bearing 25, and held in adjusted position by a set screw 31. The bearings are lubricated in the same manner as those of Fig. 1.

With this arrangement, in order to adjust the bearing, the set screw 31 is loosened, and the adjusting nut 30 is turned. The operation of the bearing is precisely the same as that shown in Fig. 1, and it is lubricated in the same manner.

I claim:—

1. A device of the character specified, comprising in combination with the frame and the spring, each having bearings, of a shaft in each bearing, each shaft having its ends reduced, shackles at the ends of the bearing, each shackle having a cylindrical recess at the reduced portion of the adjacent shaft, and a roller bearing consisting of a series of rollers and a sectional race composed of inner and outer sections, the inner section fitting on the reduced portion of the shaft and the outer section fitting within the cylindrical recess of the shackle, means for adjusting the outer section of the race with respect to the inner section, said rollers being tapering from their inner ends outward, and having their axes parallel with the axis of the shaft.

2. A device of the character specified, comprising in combination with the frame and the spring, each having bearings, of a shaft in each bearing, each shaft having its ends reduced, shackles at the ends of the bearing, each shackle having a cylindrical recess at the reduced portion of the adjacent shaft, and a roller bearing consisting of a series of rollers and a sectional race composed of inner and outer sections, the inner section fitting on the reduced portion of the shaft and the outer section fitting within the cylindrical recess of the shackle, means for adjusting the outer section of the race with respect to the inner section.

3. A device of the character specified, comprising in combination with the frame and the spring, each having bearings, of a shaft in each bearing, each shaft having its ends reduced, shackles at the ends of the bearing, each shackle having a cylindrical recess at the reduced portion of the adjacent shaft, and a roller bearing consisting of a series of rollers and a sectional race composed of inner and outer sections, the inner section fitting on the reduced portion of the shaft and the outer section fitting within the cylindrical recess of the shackle.

4. A shackle for connecting springs to frames of motor vehicles, comprising a shaft adapted to engage the bearings, said shaft having its ends reduced, and a roller bearing arranged between each reduced end of the shaft and the bearing, each roller bearing consisting of a series of rollers, and a sectional race, the rollers being arranged between the sections, and one of the sections being adjustable with respect to the other, each roller tapering from its inner end outward and being arranged with its axis parallel to the axis of the shaft.

5. The combination with a spring having a bearing, of a shaft extending through the bearing and having reduced end portions forming annular shoulders, anti-friction elements carried in said reduced end portions, washers confined between said annular shoulders and said anti-friction elements, and means to adjust said anti-friction elements on the reduced end portions of said shaft.

EDWIN LEO BALL.